United States Patent [19]

Niedecker

[11] 4,429,862
[45] Feb. 7, 1984

[54] APPARATUS FOR POSITIONING A WORKPIECE

[76] Inventor: Herbert Niedecker, Am Ellerhang 6, Königstein 2, Fed. Rep. of Germany, 6240

[21] Appl. No.: 198,882

[22] Filed: Oct. 20, 1980

Related U.S. Application Data

[63] Continuation of Ser. No. 2,928, Jan. 12, 1979, abandoned.

[30] Foreign Application Priority Data

Jan. 23, 1978 [DE] Fed. Rep. of Germany ....... 2802791

[51] Int. Cl.³ ............................................. B23Q 1/00
[52] U.S. Cl. ........................................ 269/47; 269/91; 269/258; 269/296; 269/309
[58] Field of Search ................... 269/91, 94, 258, 239, 269/296, 309–314, 75, 47, 49–52, 164, 900, 249, 303; 248/663

[56] References Cited

U.S. PATENT DOCUMENTS

| | | | |
|---|---|---|---|
| 1,063,332 | 6/1913 | Diehl | 269/249 |
| 1,380,347 | 6/1921 | Blume | 248/663 |
| 1,497,107 | 6/1924 | Lasell | 269/164 |
| 1,676,290 | 7/1928 | Schron | 269/52 |
| 1,788,652 | 1/1931 | Andrew et al. | 269/49 |
| 1,807,795 | 6/1931 | Pope | 269/258 |
| 2,325,387 | 7/1943 | Fredrickson | 269/94 |
| 2,547,211 | 4/1951 | Holmes . | |
| 2,593,538 | 4/1952 | Cleveland . | |
| 2,619,010 | 11/1952 | Mathison . | |
| 2,828,589 | 4/1958 | Hercik . | |
| 3,181,858 | 5/1965 | Daniels | 269/296 |
| 3,353,771 | 11/1967 | Te Bow | 248/663 |
| 3,606,300 | 9/1971 | Davis | 269/296 |
| 4,157,819 | 6/1979 | Meyer | 269/303 |

FOREIGN PATENT DOCUMENTS

| | | |
|---|---|---|
| 1158910 | 10/1963 | Fed. Rep. of Germany ...... 269/258 |
| 1903576 | 8/1973 | Fed. Rep. of Germany . |
| 121295 | 7/1976 | German Democratic Rep. . |
| 583756 | 11/1944 | United Kingdom . |
| 820224 | 11/1956 | United Kingdom . |
| 910717 | 3/1961 | United Kingdom . |
| 1135922 | 1/1968 | United Kingdom . |

OTHER PUBLICATIONS

"Werkstueckspanner" (Vorrichtungen) by K. Schreyer; Springer-Verlag, Berlin, Heidelberg, New York 1969.
"Berechnung und Konstruktion von Vorrichtungen" by Erich Ziegener; published by Veb Verlag Technik, Berlin.

*Primary Examiner*—Robert C. Watson
*Attorney, Agent, or Firm*—W. G. Fasse; D. H. Kane, Jr.

[57] ABSTRACT

In a device for positioning and clamping workpieces in three dimensions which are to be machined and comprising positioning members and clamping members, the improvement wherein the positioning members and clamping members for defining a first plane comprise spherical members each having a flat surface for engaging a workpiece and a spherical seat for each spherical member, each member being capable of limited rotational movement in its seat.

6 Claims, 20 Drawing Figures

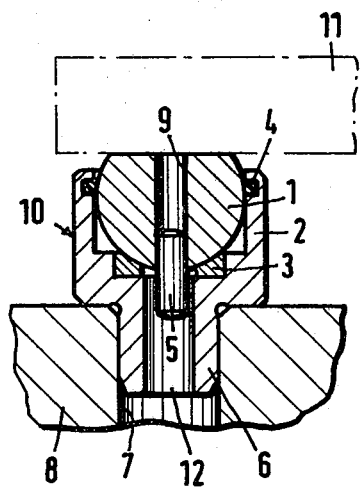
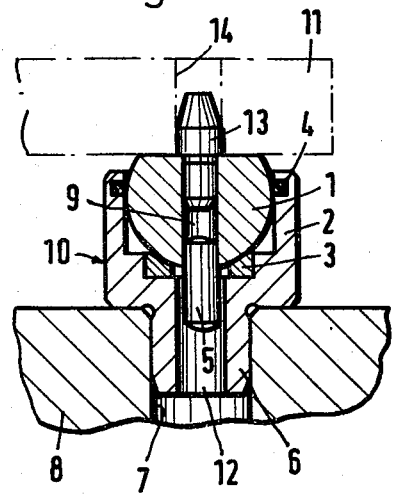
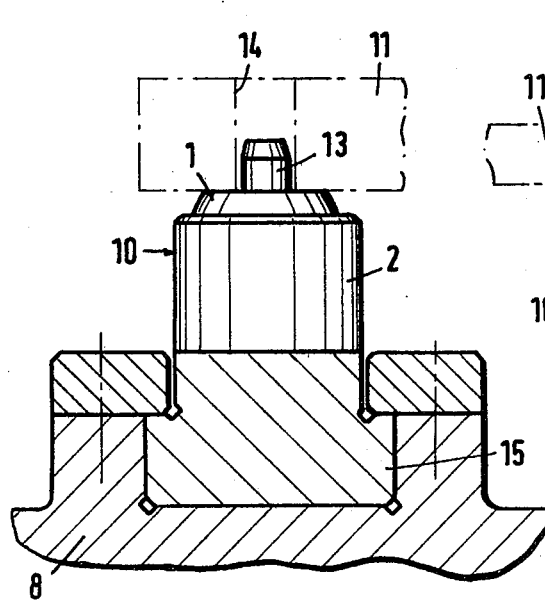
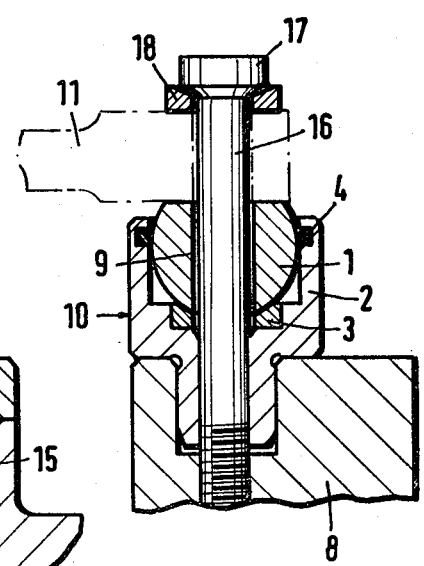

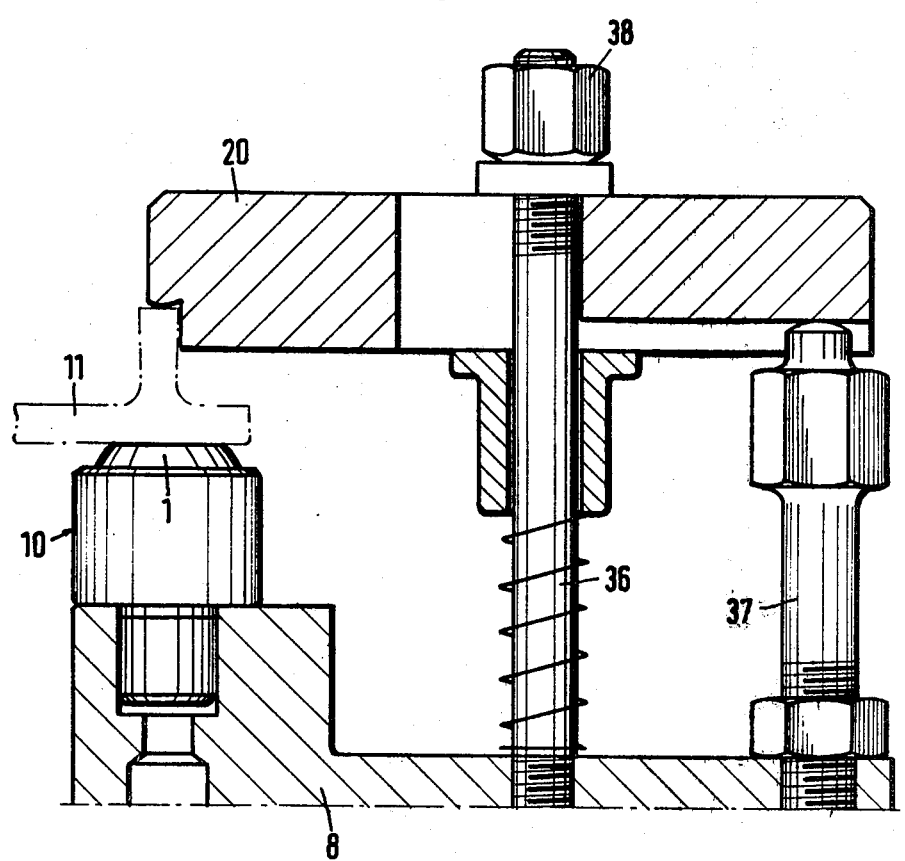

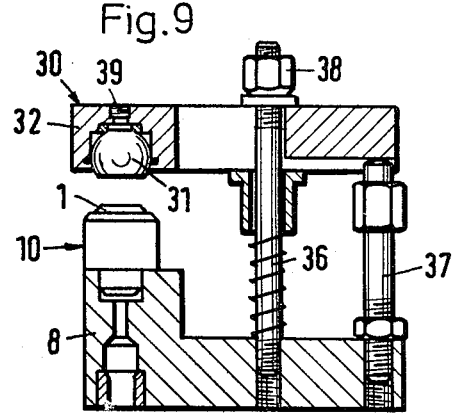
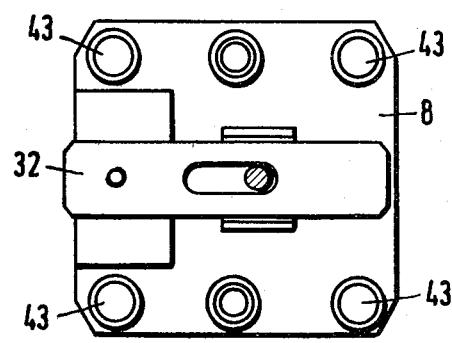
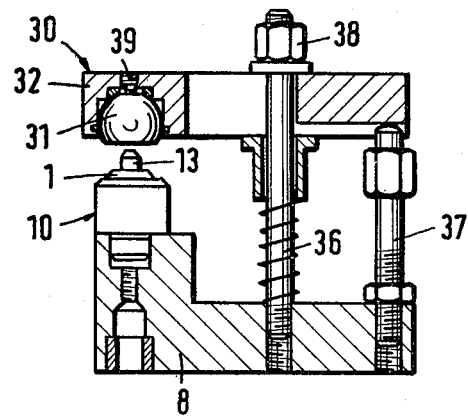

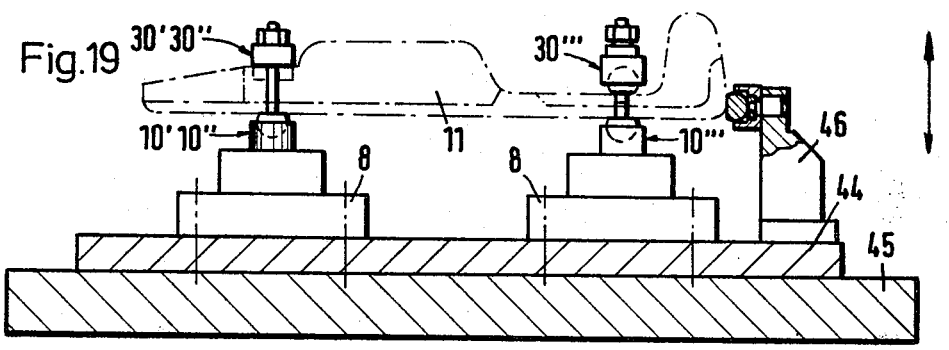
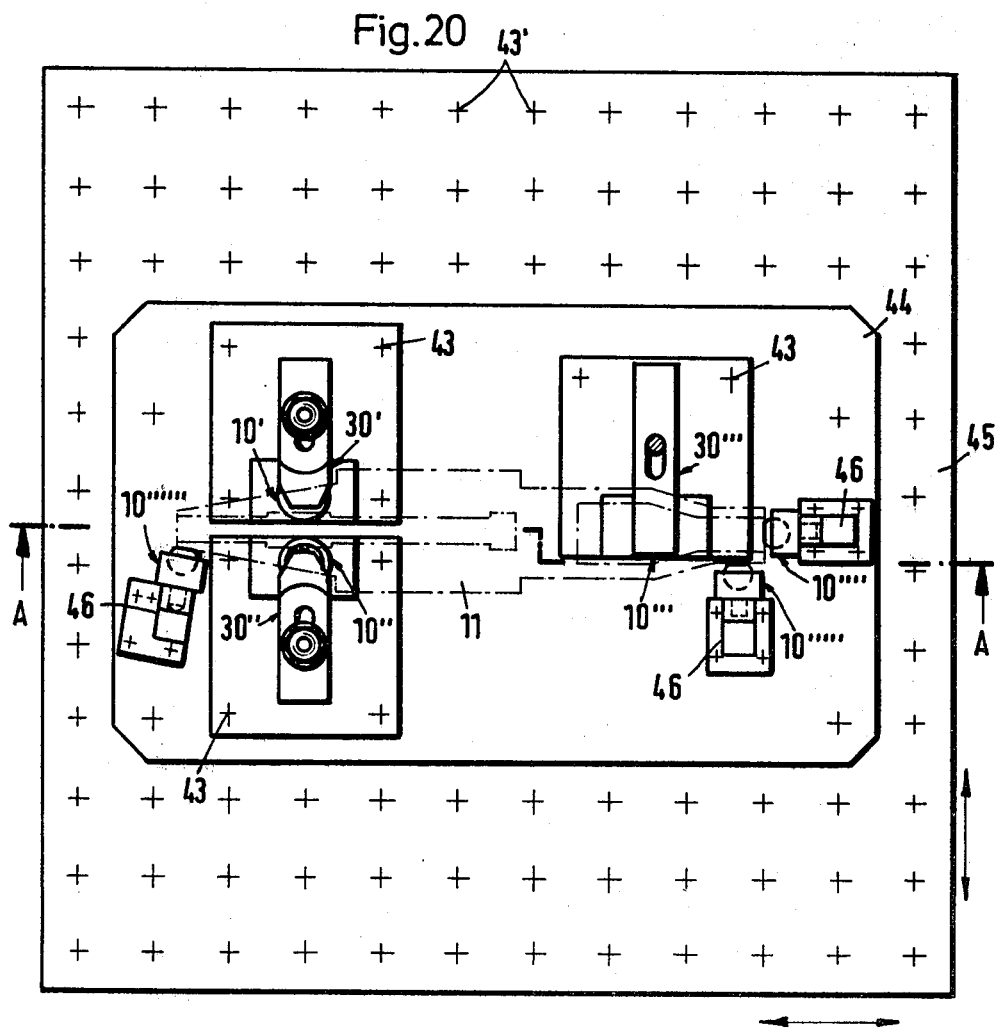

APPARATUS FOR POSITIONING A WORKPIECE

This is a continuation of application Ser. No. 002,928, filed Jan. 12, 1979 now abandoned.

This invention relates to a device for the positioning and clamping of workpieces having irregular or random surface configurations which are to be machined, comprising positioning members and clamping members.

When blanks are to be machined in the manufacture of finished workpieces, such as parts of machines or aircraft, the blanks must be correctly positioned in space so that they are properly accessible to the machining tools. The workpiece may be positioned with respect to one, two or three planes in a three-dimensional coordinate system having the space coordinates X, Y, Z. According to the invention the workpiece is positioned by suitable devices before it is clamped.

The positioning with respect to the first plane is effected in that the workpiece is placed on three workpiece seating surfaces, which are usually fixed.

The positioning with respect to the second plane is effected by two stops. The positioning with respect to the third plane is effected by an additional stop.

Further supports or stops may serve to support the workpiece but do not serve to define the position for machining.

When the blank has been positioned on the seating surfaces, it is clamped by means of clamping members having clamping surfaces and must be held in position as it is machined. The clamping members have clamping surfaces and will be selected in dependence on the specific shape of the workpiece and the intended machining.

The positioning with respect to the first plane in a rectangular three-dimensional coordinate system must be highly accurate and has been very time-comsuming heretofore because the blanks have uneven or random surfaces. This positioning with respect to the first plane often could not be effected with the required accuracy heretofore unless the engaging surface of the blank has been machined prior to the positioning or seating. The invention avoids such preliminary machining.

During the clamping of the positioned blank, the presence of uneven surfaces of the blank often gave rise to an undesired straining of the blank so that the machining would result in a defective workpiece. Even when the engaged surfaces of the blank have been machined before, it is not always ensured that the workpiece will not be strained as it is clamped. Previously these difficulties have been kept within tolerable limits in that the surfaces for engaging the workpiece for the positioning with respect to the first plane were made as accurate as necessary by said preliminary machining although this required a high additional labor expenditure.

From U.S. Pat. Nos. 2,619,010 and 2,847,022 it is known that workpieces to be machined can be clamped by a clamping bar which carries a hemispherical element, which has a base for engaging the workpiece whereas its spherical surface is fitted in a seat formed in the clamping member. This feature is used in the prior art to facilitate the use of the clamping member with workpieces which differ in height. In accordance with said references, the workpiece is positioned in the usual manner described above.

It is an object of the invention to provide a device which serves for the positioning and clamping of workpieces and enables a workpiece to be positioned and clamped without being strained.

This object is accomplished according to the invention in that the members for positioning a workpiece with respect to the first plane comprise a set of three flattened spherical elements which provide three seating surfaces and which are mounted for a universal pivoting movement in spherical seats formed in respective sockets. The flat seating surfaces directly engaging the workpiece.

Desirably, the positioning members comprising flattened spherical elements are combined with clamping members also having spherical elements which are also mounted for a universal pivoting movement in spherical seats.

It has been found that the previous need for a preliminary machining of positioning surfaces of workpieces can be eliminated by the use of the device according to the invention because the flattened spherical elements provide for a compensation of those surface irregularities of the positioning surfaces of the workpiece which previously caused the workpiece to be strained as it was clamped. The spherical elements provided on the clamping members serve also to avoid a straining of the workpiece. This results in a great saving of manufacturing costs because the workpieces need no longer be provided with positioning surfaces, which involved a high expenditure. The need for a subsequent machining of workpieces which had been improperly machined because they had been strained in the previous practice is also eliminated. Besides, the novel devices are less expensive because they can be used in a modular system, particularly in combination with existing base plates or grid plates.

In a particularly desirable embodiment of the device according to the invention the positioning members and the clamping members are disposed opposite each other and preferably also in register with each other in pairs. This arrangement serves also to avoid a straining of the workpiece.

In accordance with the invention, additional supporting and clamping members, particularly for the supporting with respect to the first plane, may be provided in addition to the positioning members and to the first mentioned clamping members. Said additional supporting members and additional clamping members may preferably be arranged opposite each other and also comprise flattened spherical elements, which are movably mounted in spherical seats for a universal pivoting movement and which have flat support and clamping surfaces for directly engaging the workpiece. These additional supporting members and additional clamping members serve also to avoid a straining of the workpiece especially if they are arranged so that the members of a pair are aligned with each other.

According to a preferred further feature of the invention, the stops for positioning the workpiece with respect to the second and third planes also comprise flattened spherical elements which are movably mounted in spherical seats for a universal pivoting movement and have flat seating surfaces for engaging a workpiece. In this way the positioning members for defining the second and third planes also embody the concept of using flattened spherical elements in order to avoid a straining of the workpiece as it is clamped after it has been positioned. Alternatively, conventional stops may be used to position the workpiece with respect to the second and third planes.

According to a further feature of the invention the positioning elements for defining the second and third planes may be incorporated in the positioning elements for defining the first plane. In that case each of the positioning members for defining the second and third planes comprises a locating pin, which is receiveable by a bore of the workpiece and is incorporated in a positioning member for defining the first plane. In that case too, the workpiece can be clamped without being strained. This feature of the invention also results in a saving of costs because additional positioning members for defining the second and third planes are not required.

According to a further feature of the invention, each of the positioning members for defining the second and third planes comprises a screw with a shaft that is used to clamp the workpiece and for this purpose extends through a bore in the positioning member for defining the first plane whereas the head of the screw serves to clamp the workpiece and has a spherical undersurface, which fits a spherical seat member, which has a flat surface that engages the workpiece.

In the just mentioned embodiment of the device according to the invention, the positioning members for defining the second and third planes constitute also clamping members for clamping the workpiece.

Finally, the head of the screw may be received in a recess of the workpiece. If the workpiece has surfaces which permit of such an arrangement of the clamping members, these surfaces can be machined without obstruction.

The positioning members according to the invention may be used in combination with conventional clamping members although such an arrangement will not always afford all advantages of the device according to the invention.

Further details, features and advantages of the invention will become apparent from the following description of several illustrative embodiments with reference to the drawings, in which FIGS. 1 to 9, 11 to 13 and 19 are partial sectional views in which:

FIG. 1 shows a positioning member for defining the first, second and third planes;

FIG. 2 shows the member of FIG. 1 constructed with a positioning member or element for defining the second and third planes;

FIG. 3 shows a modification of the member of FIG. 2, in which the positioning member is mounted in a movable slide;

FIG. 4 shows the member of FIG. 1 in which the positioning member for defining the second and third planes also constitutes a clamping member;

FIG. 8 shows a positioning member in conjunction with a conventional clamping member;

FIG. 9 shows a device according to the invention comprising a positioning member for defining the first plane and an oppositely disposed clamping element;

FIG. 10 is a top plan view showing the device of FIG. 9;

FIG. 11 shows a modification of the device of FIGS. 9 and 10, in which the positioning member for defining the first plane is provided with a positioning member for defining the second and third planes;

FIG. 19 is a sectional view taken on line A—A of FIG. 20, which is a top plan view, and shows positioning members functioning as additional stops.

In the following detailed description of the drawings, identical or similar parts are designated with the same reference characters in the several figures.

Figure 5:
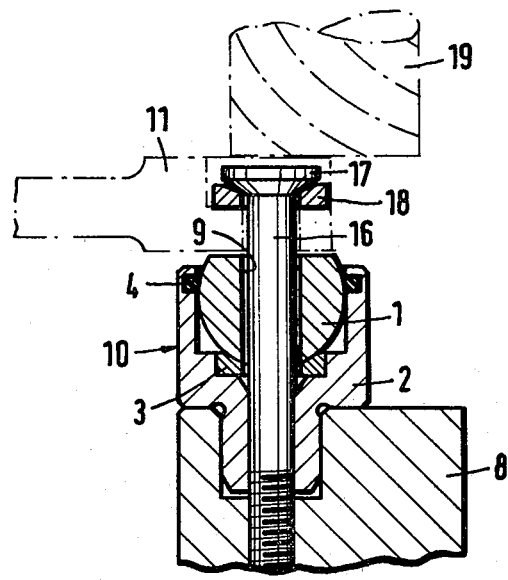
FIG. 5 shows the positioning and clamping member of FIG. 4 having a head which is received in a recess of the workpiece.

FIG. 1 shows a positioning member 10 of the device according to the invention. The member 10 comprises of a flattened sphere or spherical ball element 1, which has a segment cut off to form a flat workpiece seating surface for engaging a workpiece 11. The spherical element 1 is mounted in a housing 2 and can be universally pivoted within certain angular limits. The spherical element 1 is pivotally mounted in a spherical seat or ball socket 3 provided in the housing 2. The housing 2 of the positioning member 10 has an extension 6 forming a carrier means, which is fitted in a bore 7 of a footplate 8 of the device according to the invention. In order to prevent an excessive pivotal movement of the spherical element 1 in the housing 2, a pin 5 is provided, which is forcefitted in a bore 9 of the spherical element 1 and protrudes into a larger bore 12 of the extension or carrier 6 so that the spherical element 1 is limited in its pivotal movement in the ball socket 3 of the housing 2. The sphere or ball element 1 with its ball socket 3 provides a universal pivot means.

In order to prevent an ingress of soil between the spherical element 1 and the housing 2 and thus to ensure that the spherical element 1 can easily pivot, a seal 4, e.g., an O-ring, is provided at the top rim of the housing 2.

Because the spherical element or ball 1 is pivotally mounted in the housing 2, the flat surface of the spherical element 1 can be directly engaged with the workpiece 11 as shown in all figures so that the latter can be exactly positioned by three positioning members 10 without a need for a preliminary machining of those surfaces of the workpiece which are directly engaged by the flat surfaces of the spherical elements 1.

The positioning members 10 shown in the subsequently described figures are constructed as the positioning member 10 which has been described with reference to FIG. 1. In order to avoid repetition, only the differences between the subsequent figures and FIG. 1 will now be discussed.

In FIG. 2 the positioning member 10 of FIG. 1 is additionally provided with a locating pin 13, which is force-fitted in the bore 9, in which the pivotal movement limiting pin 5 is fitted. The locating pin 13 fits in a bore 14 of the workpiece 11. To position the workpiece with respect to the second and third planes, two of the three positioning members 10 which define the first plane may be provided with such locating pins 13.

For a compensation of inaccuracies regarding the spacing of the locating bores 14 in the workpiece 11, one of the two positioning members 10 shown in FIG. 3 and provided with a locating pin 13 is mounted on a longitudinal or transverse slide 15, which is mounted in the footplate 8 whereby the positioning member 10 is position adjustable.

FIGS. 4 and 5 show a modification of the means shown in FIGS. 2 and 3 for defining the second and third planes. In accordance with FIGS. 4 and 5, the workpiece is positioned or rather its position with regard to the second or third plane is determined by means of a screw 16 rather than by a locating pin 13. The screw 16 is smaller in diameter than the bore 9 of the spherical element 1 so that the latter is capable of a limited rotation about the screw 16. The screw 16 has a sliding fit in the extension or carrier 6 of the housing 2. Female screw threads for cooperating with the screw 16 are provided in the footplate 8. Longitudinal or transverse slides may again be used to compensate for inaccuracies regarding the spacing of the locating bores in the workpiece 11.

The head 17 of the screw 16 has a spherical surface portion which faces the workpiece and can slidably engage a spherical seat or washer 18.

FIG. 5 shows how the head 17 of the screw is received in a recess of the workpiece 11 so that said head 17 will not obstruct the movement of a machining tool 19, e.g., a milling cutter.

Figure 6:
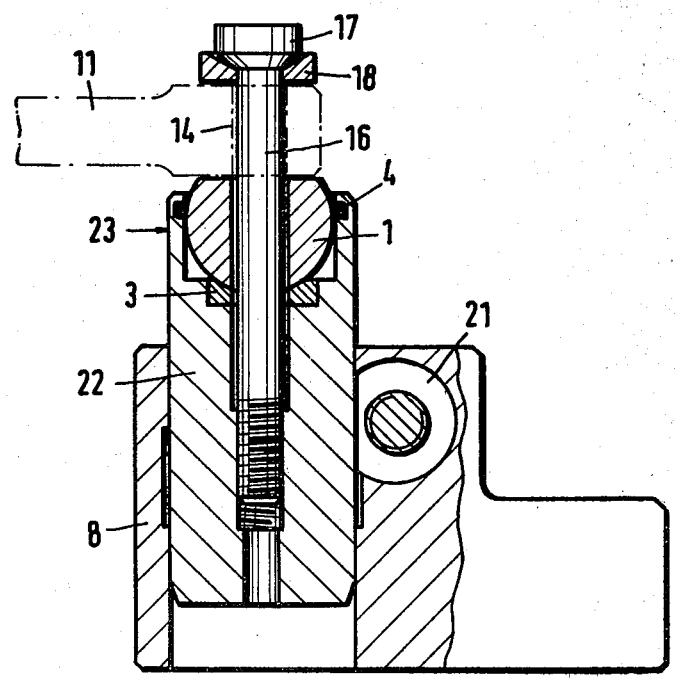
FIG. 6 shows a supporting and clamping member which is position adjustable.

FIG. 6 shows a vertically position adjustable supporting means 23 including clamping means constructed as shown in FIGS. 4 and 5. The housing 22 is vertically slidably mounted in a base member 8. The housing 22 and with it the flat supporting surface with which the spherical element 1 directly engages the workpiece can be fixed in an adjusted elevation by means of a clamp 21. The clamping member of FIG. 6 comprises the screw 16, the head 17 of which has a spherical surface which faces the workpiece 11 and slidably engages a spherical seat or washer 18, whereby the housing 22 is position adjustable.

Figure 7:
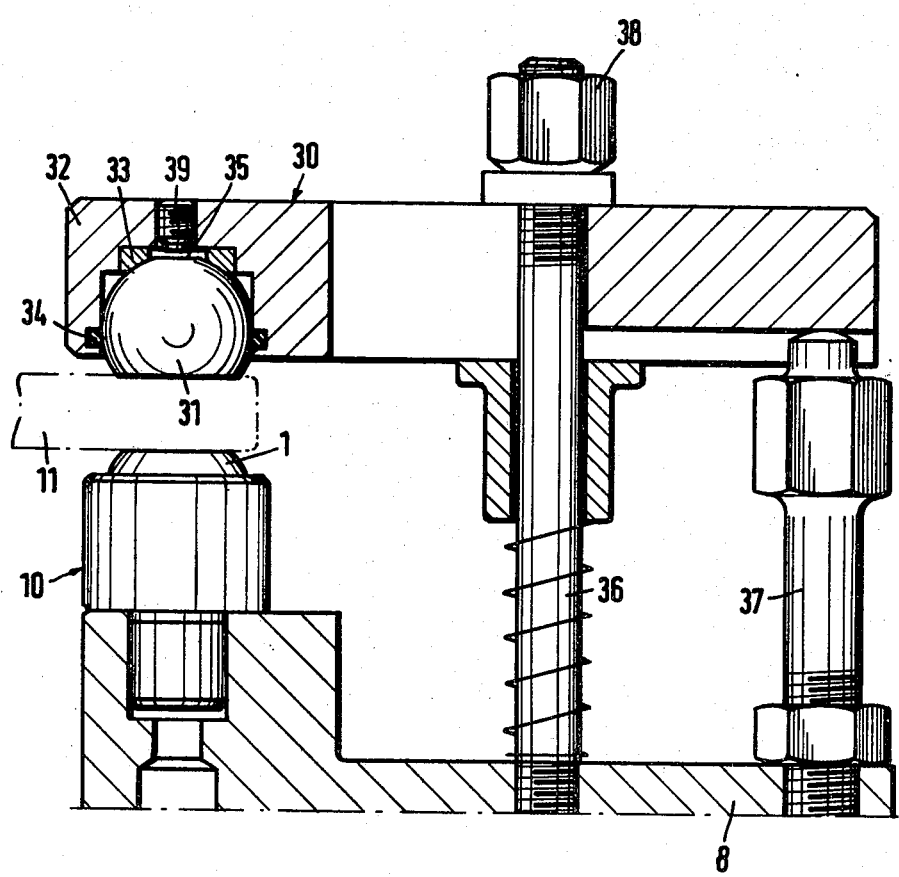
FIG. 7 shows the device according to the invention which serves to position and clamp a workpiece and comprises a clamping member and a seating member each having a flattened spherical element whereby both members are arranged in alignment or register with each other.

FIG. 7 shows a device according to the invention which comprises a positioning member 10 and a clamping member 30. The clamping member 30 comprises a flattened spherical clamping element 31, which is received in a spherical seat 33 provided in a housing 32, which is formed by a clamping bar. A seal 34 is provided between the spherical element 31 and the housing 32. A headless set screw 39 is screwed in the housing 32 and engageable with another flat surface 35 of the spherical element 31 to limit the pivoting of the spherical clamping element 31. In case of an excessive pivotal movement of the spherical clamping 31, its non-flat surface will engage the set screw 39 so that a further rotation is prevented. Just as the spherical element 1 of the positioning member 10 has a flat workpiece seating surface, the spherical clamping element 31 has a flat clamping surface which directly engages the workpiece 11.

A stud 36 is screwed in the footplate 8. A backing member 37 is also screwed in the footplate 8 and may consist of a hydraulic actuator. When the workpiece 11 has been positioned, it is clamped in that the nut 38 is tightened.

In the embodiment shown in FIG. 8, the workpiece 11 is clamped in conventional manner with a clamping bar 20.

FIGS. 9 to 14 show devices in which positioning members and clamping members shown in FIGS. 1, 2, 3 and 7 are assembled.

Figure 13:
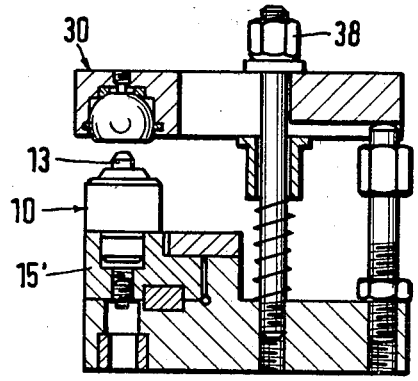
FIG. 13 shows a further modification of the device according to FIG. 11 but provided with a transverse slide.
Figure 14:
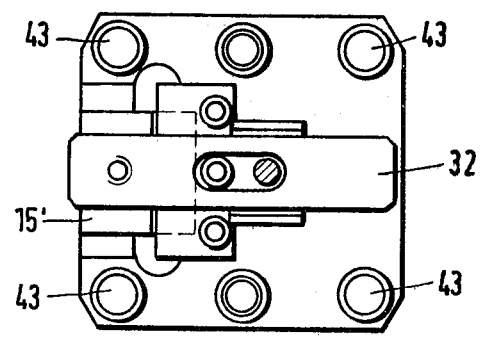
FIG. 14 is a top plan view showing the device of FIG. 13.

FIGS. 9 and 10 show a device in which the members of FIGS. 1 and 7 are combined. FIG. 11 shows a device in which the members of FIGS. 3 and 7 are combined and in FIG. 12 the positioning member 10 is mounted in a longitudinal slide 15. FIGS. 13 and 14 are a front elevation and top plan view showing a combination of members as shown in FIGS. 3 and 7 and a transverse slide 15' in which the positioning member 10 is mounted.

Illustrative applications of devices according to the invention provided on a common baseplate 45 and used to position and clamp different workpieces are shown in FIGS. 15 to 20.

Figure 12:
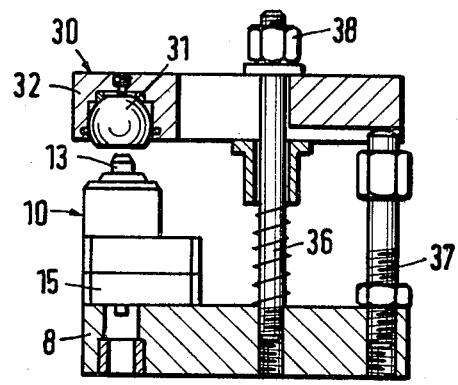
FIG. 12 shows a device according to FIG. 11 provided with a longitudinal slide.
Figure 15:
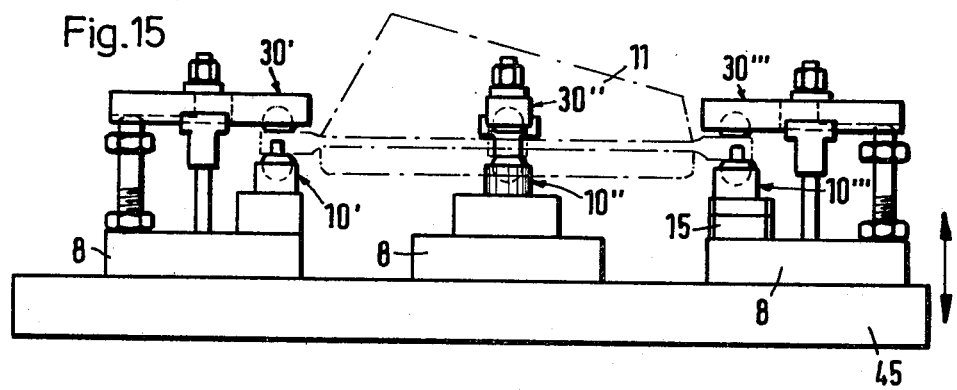
FIG. 15 shows in a side elevation how a workpiece indicated in phantom lines has been positioned and clamped on a common baseplate by means of devices according to FIGS. 9, 11 and 12 providing a set of three workpiece seating surfaces for first positioning a workpiece and three clamping surfaces for then clamping a workpiece.
Figure 16:
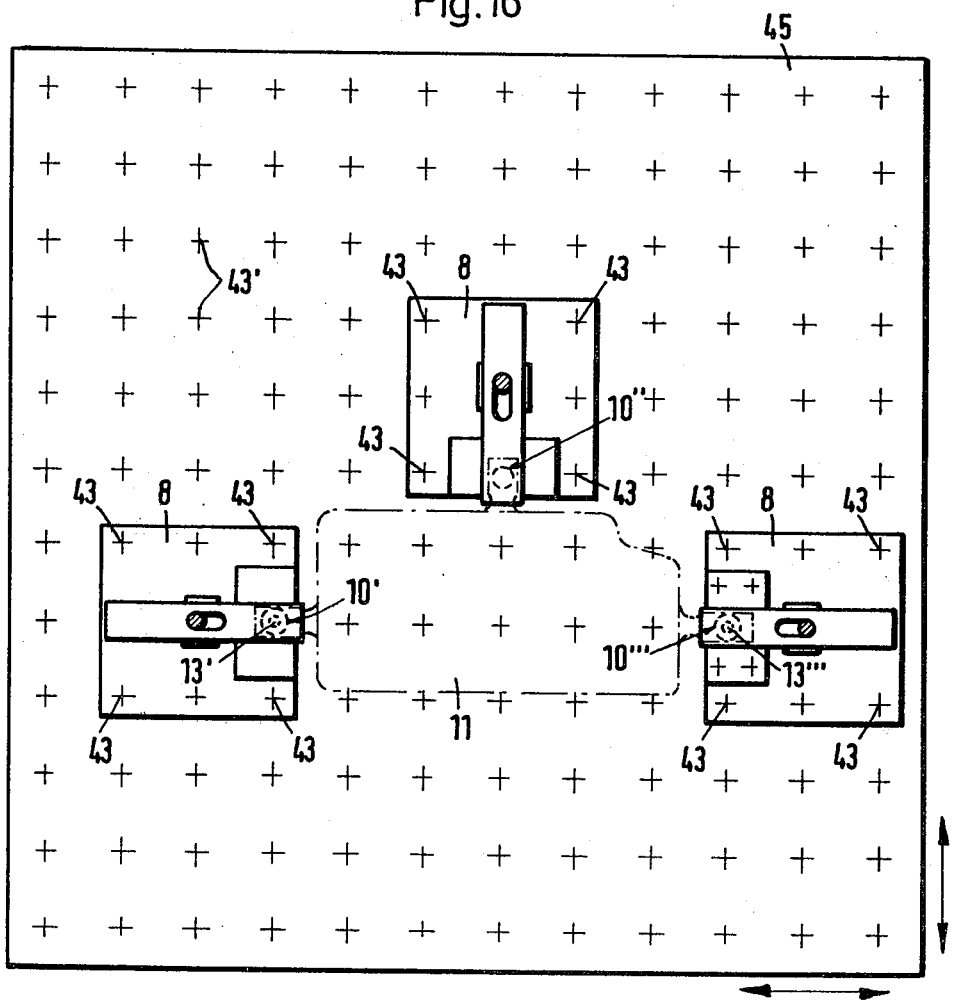
FIG. 16 is a top plan view showing the device of FIG. 15.

FIGS. 15 and 16 are a front elevation and a top plan view, respectively, showing a workpiece 11 which has been positioned and clamped by means of devices as shown in FIGS. 9, 11, and 12. The double-headed arrow in FIG. 15 indicates the direction of movement with respect to the first plane. The double-headed arrows in the lower right-hand corner of FIG. 16 indicate the directions of movement with respect to the second and third planes of a three-dimensional coordinate system. The workpiece 11 is positioned with respect to the first plane by three positioning members 10', 10", and 10''' providing a set of three seating surfaces. As is apparent from FIG. 16, the workpiece is positioned with respect to the second and third planes by means of the locating pins 13' and 13" in the two positioning members 10" and 10'''. For a compensation of inaccuracies regarding the spacing of the locating bores of the workpiece 11, the positioning member 10''' is mounted in a longitudinal slide 15. Clamping elements 30', 30" and 30''' are associated with respective positioning elements and serve to clamp the workpiece 11 in the position which has been defined by the positioning elements 10', 10", and 10'''.

From the top plan view of FIG. 16 it is also apparent that the footplate 8 of each device has bores 43, which are arranged in the same pattern as bores 43' in a bench or plate 45, so that it is relatively easy to secure the devices to the bench or plate 45, e.g., by means of screws.

Figure 17:
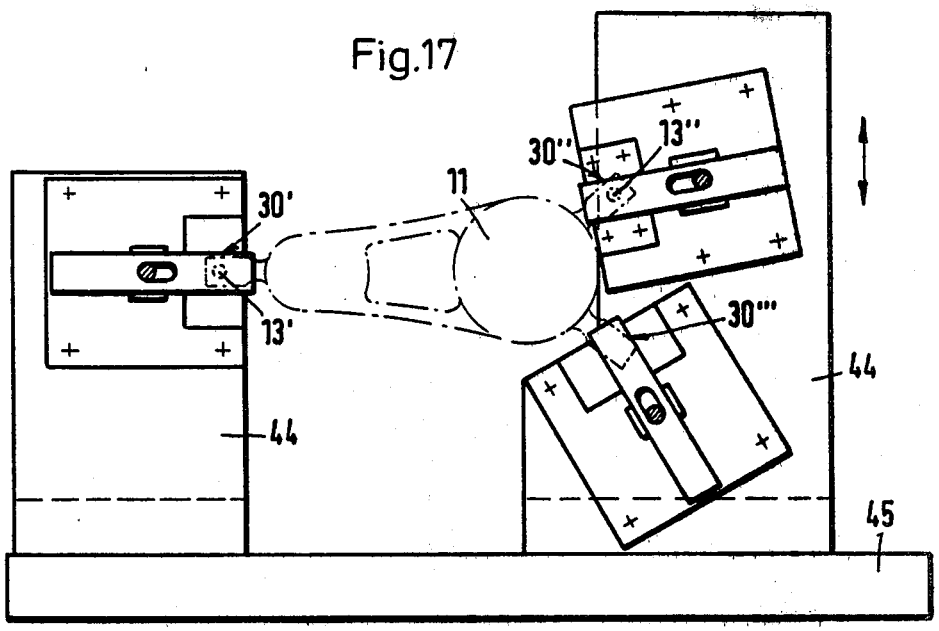
FIGS. 17 and 18 are a front elevation and a top plan view, respectively, showing by way of example an application of the devices according to the invention
Figure 18:
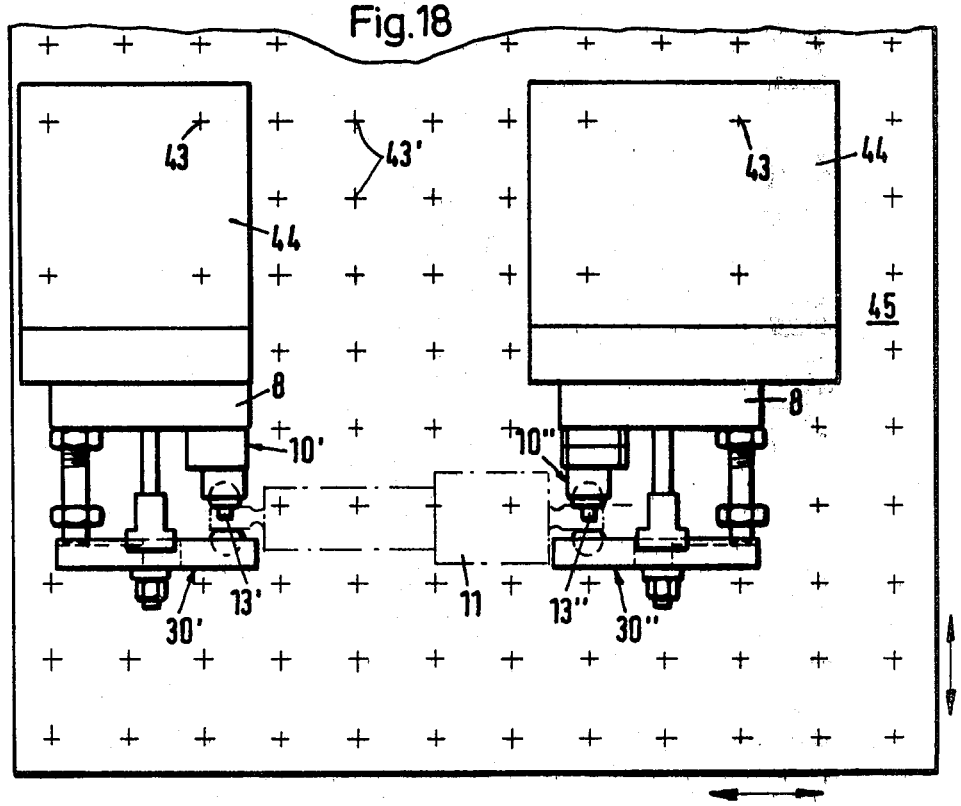

FIGS. 17 and 18 show a workpiece 11 which has been positioned and clamped with the aid of interposed elements, such as angles 44. In this embodiment the positioning and clamping devices are mounted on angles when this is required for the machining of the workpiece 11.

FIGS. 19 and 20 show the use of the device according to the invention for positioning and clamping a workpiece 11 with respect to a first plane by means of positioning elements 10', 10" and 10'''. Positioning elements 10'''', 10''''', and 10'''''' of the kind shown in FIG. 1 are used to position the workpiece with respect to the second and third planes and provide adjustable stops, which are secured to brackets 46.

It will be appreciated that the instant specification and examples are set forth by way of illustration and not limitation, and that various modifications and changes may be made without departing from the spirit and scope of the present invention.

What is claimed is:

1. In a device for positioning and clamping workpieces in three dimensions, which are to be machined, comprising a carrier means carrying three positioning members and clamping means, the improvement wherein each of the positioning members comprises a spherical member having an upper flat plane surface for engaging a workpiece and a spherical seat for each spherical member, each spherical member being capable of limited rotational movement in its seat, at least one of the spherical members having an axial bore and a bolt with a threaded end, said bolt projecting through said axial bore centrally through said upper flat plane surface of said one spherical member, said bolt engaging with its threaded end said carrier means, said bolt forming said clamping means comprising a bolt head having a spherical lower surface facing down, and a washer having a lower flat surface and an aperture surrounded by an upper spherical surface facing up for cooperation with said spherical lower surface of said bolt head, said bolt also projecting through the aperture of said washer and sitting with its spherical lower surface on the upper spherical surface of said washer for clamping a workpiece directly between the upper flat plane surface of said one spherical member and said lower flat surface of said washer, said washer aperture and said axial bore both having a diameter larger than said bolt for a positional adjustment between said clamping means and a workpiece with a hole through which the bolt extends.

2. A device according to claim 1, wherein at least one positioning member is disposed opposite a clamping element.

3. A device according to claim 1, including supporting members and additional clamping elements disposed opposite one another and each having a flattened spherical element capable of rotational movement in a spherical seat and having a flat surface for engaging the workpiece.

4. A device according to claim 1, further including stops for defining the second and third dimensions, such stops also comprising flattened spherical elements each rotatably mounted in a spherical seat and having a flat surface for engaging the workpiece.

5. A device according to claim 3, wherein each positioning member includes a locating pin receivable by a bore of the workpiece and incorporated in the positioning element for defining the first dimension.

6. A device according to claim 4, wherein each of the positioning elements for defining the three dimensions comprises a screw having a shaft which serves to position the workpiece by extending through a bore in the positioning element for defining the first dimension, the head of the screw serving to clamp the workpiece and having a spherical under-surface which fits a spherical seat member which has a flat surface for engaging the workpiece.

* * * * *